No. 770,972. PATENTED SEPT. 27, 1904.
J. LEIGHTHAM.
BOLT AND NUT LOCK.
APPLICATION FILED DEC. 26, 1903.
NO MODEL.
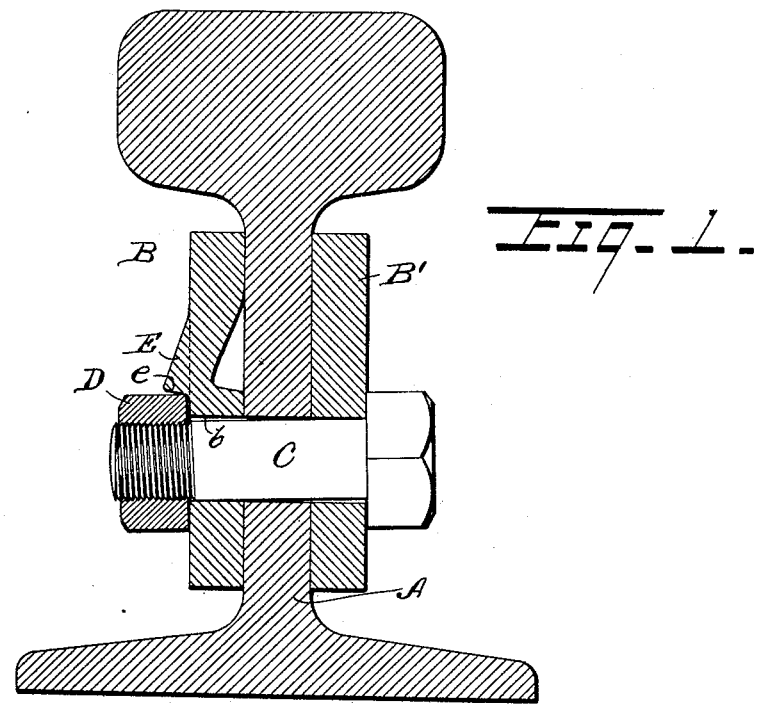
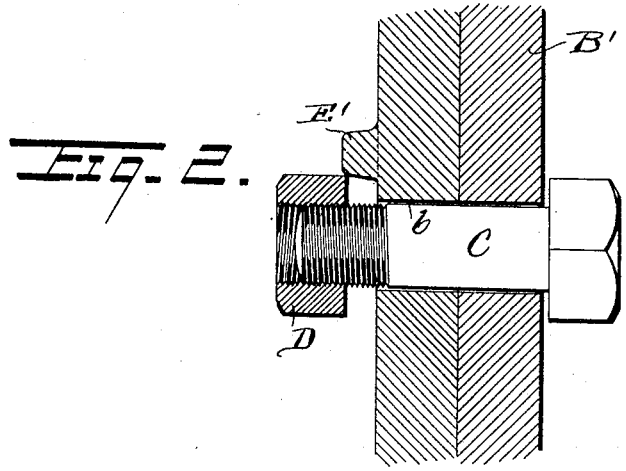
Joseph Leightham, Inventor No. 770,972. Patented September 27, 1904.

UNITED STATES PATENT OFFICE.

JOSEPH LEIGHTHAM, OF READING, PENNSYLVANIA, ASSIGNOR, BY DIRECT AND MESNE ASSIGNMENTS, OF TWO-THIRDS TO JACOB NOLDE AND JOHN A. LINDBERG, OF READING, PENNSYLVANIA.

BOLT AND NUT LOCK.

SPECIFICATION forming part of Letters Patent No. 770,972, dated September 27, 1904.

Application filed December 26, 1903. Serial No. 186,530. (No model.)

*To all whom it may concern:*

Be it known that I, JOSEPH LEIGHTHAM, a citizen of the United States, residing in the city of Reading, county of Berks, State of Pennsylvania, have invented certain new and useful Improvements in Bolt and Nut Locks, of which the following is a specification.

My invention relates to improved means for locking bolts and nuts in fixed position relative to the parts connected thereby.

A large number of locking devices have been used or suggested to prevent reverse rotation of the nut after the latter has been drawn up upon the bolt, so as to firmly connect the parts through which the latter passes, such devices in some cases being adapted to put a distorting strain upon the bolt in the act of firmly seating the nut.

My invention, however, involves the positive locking of the nut against rotation relative to the surface against which it seats during the tightening up of the connected parts and is applicable to constructions in which the bolt itself may be turned to tighten the connection.

The invention is fully described hereinafter, as shown in the accompanying drawings, and the novel features are specifically pointed out in the claim.

Figure 1 is a cross-sectional view showing a rolled metal plate embodying my improvement in combination with a bolt and nut securing the same to connected parts and locked in position. Fig. 2 is a similar view showing a cast plate loosely attached to another part with the bolt connection untightened.

In Fig. 1, A represents, for instance, the web portion of a rail, and B B' fish-plates on opposite sides thereof, firmly clamped thereto by means of bolts C, as usual. The plate B, against the outer face of which the nut D is seated, is provided with a beveled lug E on said outer face adjacent to each hole $b$ in said plate, through which the screw-threaded end of a bolt C extends. This lug E, as shown, is formed by pressing the plate metal outward from the surrounding surface at a point adjacent to the hole $b$ and shaping the same in a suitable die, so as to provide thereon a flat face $e$, inclined somewhat from a right angle to the plate and so located with reference to the hole $b$ that the base of said inclined flat face $e$ is at a less distance from the axis of said bolt-hole than is the contacting side of the nut from the axis of the nut, while the top of said inclined face is at an equal or greater distance from the bolt-axis of the hole than is the side of the nut from the axis of the nut. In the Fig. 2 construction the projection E' differs from that indicated in Fig. 1 in that it is formed integral with the plate in the process of casting the latter, whereas the projection E on the rolled plate of Fig. 1 is preferably formed, as indicated, by pressing the malleable metal in suitable dies. In each case, however, a beveled lug is specially provided adjacent to each hole to contact with the side of the nut only, as described, the accurate location of the inclined contacting face of the lug with reference to the passage-hole being essential to the securing of the desired transverse locking-pressure. In either construction shown the operation of tightening the bolt connection and the resulting locking effect are the same.

In Fig. 2 the bolt is represented in its natural position in the registering passage-holes of the connected parts, the nut being only partially run up upon the projecting end of the bolt, but already engaging the beveled lug E', so as to positively prevent its being turned relative thereto.

In Fig. 1 the bolt connection is shown tightened up, the bolt having been turned, and the nut thereby fully drawn up upon its screw-threaded end. As the nut is thus drawn up it is pressed laterally by the wedging action of the inclined face $e$ of the beveled lug E, thus straining the body of the bolt against the wall of the hole, and thereby insuring the lasting rigidity of the connection. The nut is positively locked against rotation, and the lateral strain upon the bolt-body prevents unintentional turning of the bolt itself under any jars or strains such as the structure may be liable to, while permitting forcible turning thereof by means of a suitable wrench.

What I claim is—

The combination of a bolt and nut and a plate having a passage-hole for said bolt and a beveled lug formed on the face thereof adjacent to one side of said hole and arranged to contact only with the said nut, the base of said beveled lug being at a less distance from the axis of the hole than is the contacting side of the nut from the nut-axis, substantially as set forth.

In testimony whereof I affix my signature in the presence of two witnesses.

JOSEPH LEIGHTHAM.

Witnesses:
  D. M. STEWART,
  W. G. STEWART.